United States Patent [19]

Burgess

[11] 4,212,250
[45] Jul. 15, 1980

[54] MINE LOCOMOTIVE

[75] Inventor: William F. Burgess, Maltby, England

[73] Assignee: Thomas Hill (Rotherham) Limited, Rotherham, England

[21] Appl. No.: 896,298

[22] Filed: Apr. 14, 1978

[30] Foreign Application Priority Data

Apr. 16, 1977 [GB] United Kingdom ............... 15874/77

[51] Int. Cl.² ...................... B60K 27/00; B60K 33/00; B61C 3/00
[52] U.S. Cl. .................................. 105/50; 105/329 R; 105/364; 105/456; 180/77 S; 188/170
[58] Field of Search ...................... 105/50, 329 R, 364, 105/456; 180/77 S; 188/58, 170

[56] References Cited

U.S. PATENT DOCUMENTS

| | | | |
|---|---|---|---|
| 378,864 | 3/1888 | Bauer | 105/50 |
| 384,580 | 6/1888 | Julien | 105/50 |
| 1,053,062 | 2/1913 | Palmros | 105/50 |
| 1,270,628 | 6/1918 | Larson et al. | 105/50 |
| 1,291,581 | 1/1919 | Mancha | 105/50 |
| 1,692,873 | 11/1928 | Sloane | 105/50 |
| 2,333,504 | 11/1943 | Alben | 105/50 |
| 3,501,040 | 3/1970 | Martelee | 105/456 X |
| 3,750,834 | 8/1973 | Luft | 180/77 S X |
| 3,785,325 | 1/1974 | Mycroft | 180/77 S X |
| 3,954,304 | 5/1976 | Engle | 188/170 X |
| 3,963,262 | 6/1976 | Estel | 180/77 S X |

Primary Examiner—Howard Beltran
Attorney, Agent, or Firm—Cushman, Darby & Cushman

[57] ABSTRACT

A personnel carrier for use in an underground coal mine comprises a rail vehicle having driving cabs at opposite ends thereof with driving controls in each cab. Power is supplied from a battery mounted between the cabs to an electric driving motor arranged to drive one of a pair of axles or both axles as desired through one or more respective gearboxes. Safety features include an isolating switch operable from either cab, a flameproof rotary switch disposed substantially midway between the two cabs for activating one set of driving controls or the other and operable from outside the vehicle and an emergency braking circuit. Normal braking is electrical and achieved by moving a single control lever from power to braking. The emergency brake comprises a disc brake unit on each axle urged to the on position by springs but held in the off position hydraulically providing that a foot pedal in the activated cab remains depressed.

8 Claims, 8 Drawing Figures

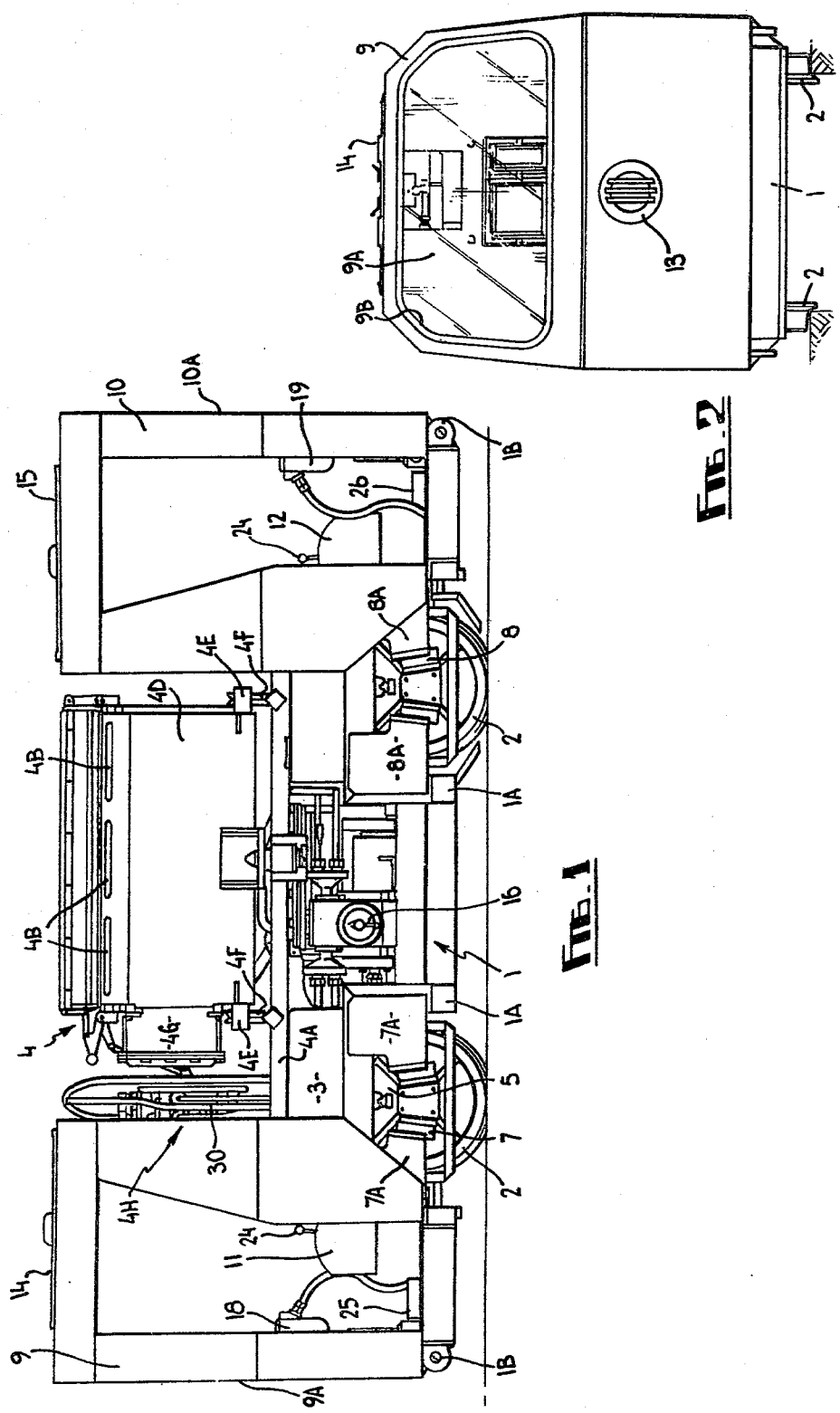

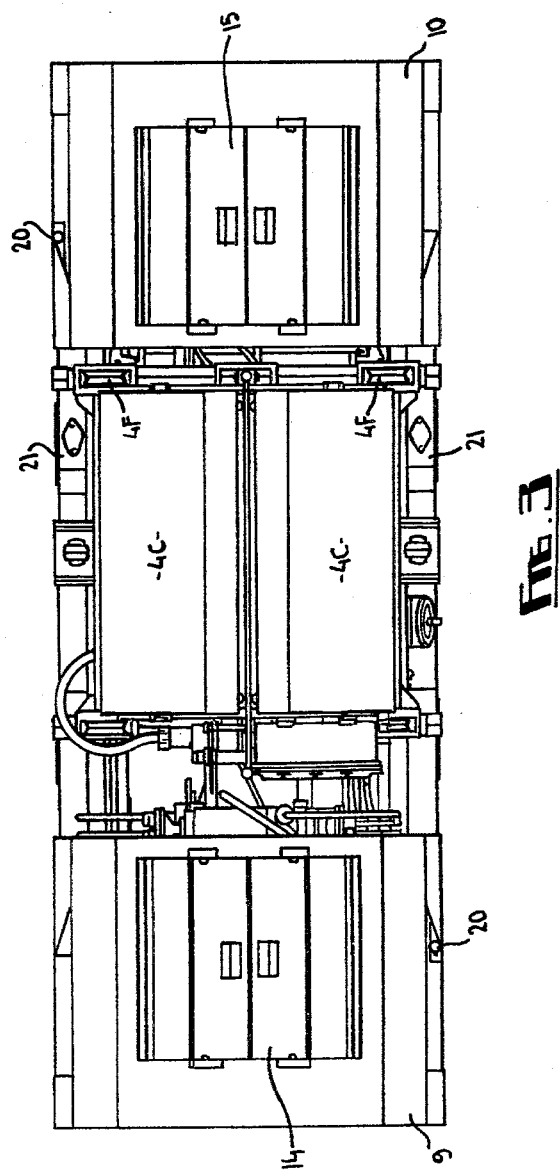

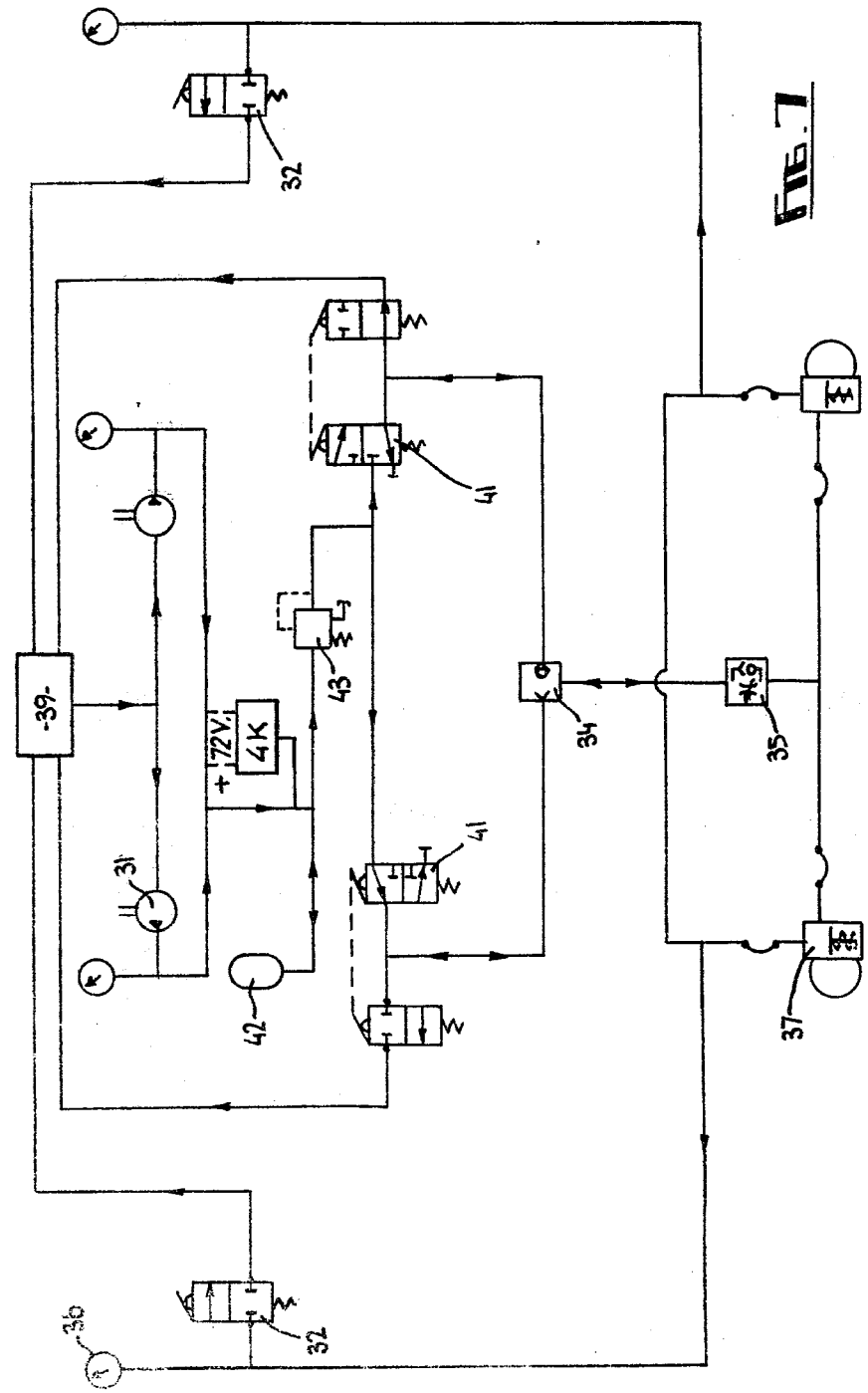

MINE LOCOMOTIVE

The present invention relates to a vehicle, particularly, but not exclusively for use underground.

In coal mines, for example, at the present time distances between points in the mine underground may be of the order of several miles. It is not unusual, for example, in larger mines for the coalface to be several miles from the base of the downcast and upcast shafts. In mines such as these personnel presently use whatever transport is available to travel between points in the mine. The transport used, having been provided for other purposes, is unsuited to the transport of personnel. Furthermore, a valuable piece of equipment is not available for the purpose for which it was intended, thus reducing the efficiency of the overall mining operation.

According to one aspect of the present invention, there is provided a vehicle for the carriage of personnel comprising a vehicle body including a driving cab at each end thereof, driving controls in each cab, traction means positioned to receive power from a battery for driving the vehicle and means disposed between the cabs for supporting the battery.

According to another aspect of the present invention, there is provided a vehicle for the carriage of personnel comprising a vehicle body including a driving cab at each end thereof, driving controls in each cab, traction means positioned for driving the vehicle and means disposed between the cabs and accessible from outside the vehicle operative to activate one set of driving controls or the other.

An advantageous embodiment of the invention may comprise any one or more of the following preferred features:

(a) The driving controls comprise a single lever controlling both drive and braking.

(b) The single lever is made detachable and is provided for both sets of controls.

(c) Lighting is provided on the front of each cab.

(d) A rotary switch is provided operative to activate either one set of controls or the other as desired.

(e) The rotary switch of (a) is disposed between the cabs and is accessible from outside the vehicle only.

(f) Each set of driving controls comprises a foot pedal whose operation is necessary to activate the drive/braking control.

(g) Each cab incorporates a sand box positioned to feed sand under gravity to either side of the wheels of the vehicle.

(h) The operative state of the lighting means of (c) is controlled in dependence upon the operative position of the rotary switch of (d).

(i) An emergency braking system for the vehicle comprises a disc brake disposed to act on a wheel of the vehicle and comprising pads biased to the on position by springs and a hydraulically operated piston and cylinder device operative to oppose the action of the springs to hold the brake off, and means for releasing the hydraulic pressure to allow the springs to urge the disc pads to an on position.

(j) The hydraulic circuit of (i) comprises a pressure switch operative to isolate the traction means until sufficient hydraulic pressure is available to release the emergency brake.

(k) The pressure switch of (j) is flameproof.

(l) The vehicle comprises two sets of wheels on respective axles and the traction means comprises a double ended traction motor operative to drive both axles.

(m) Respective gearboxes are mounted on the axles of (l).

In order that the invention may be more clearly understood, one embodiment of the invention will now by described by way of example, with reference to the accompanying drawings in which:

FIG. 1 shows a side elevational view of an underground personnel carrier,

FIG. 2 shows an end elevationl view of the carrier of FIG. 1,

FIG. 3 shows a plan view of the carrier of FIG. 1,

Figure 4:
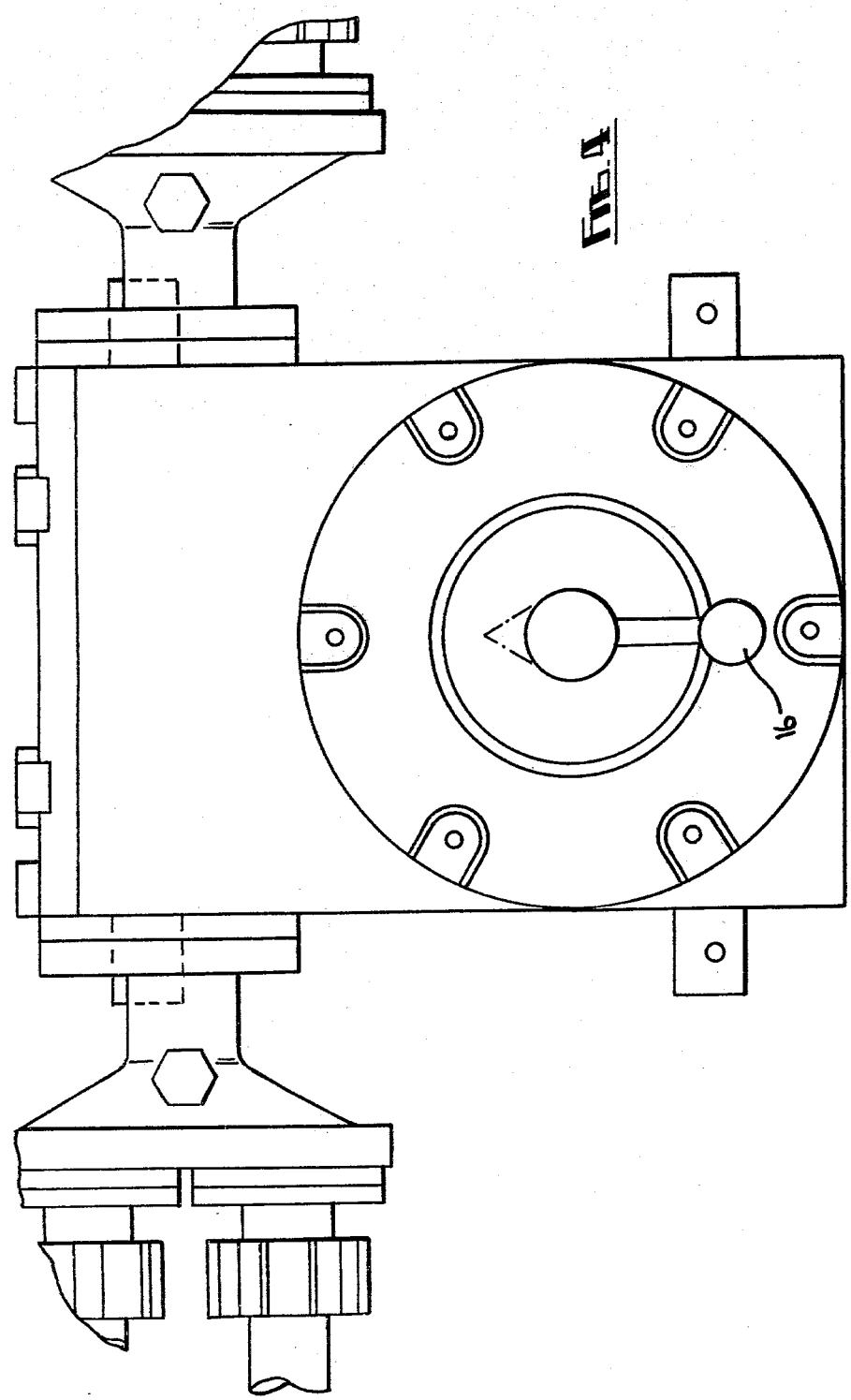
Figure 4A:
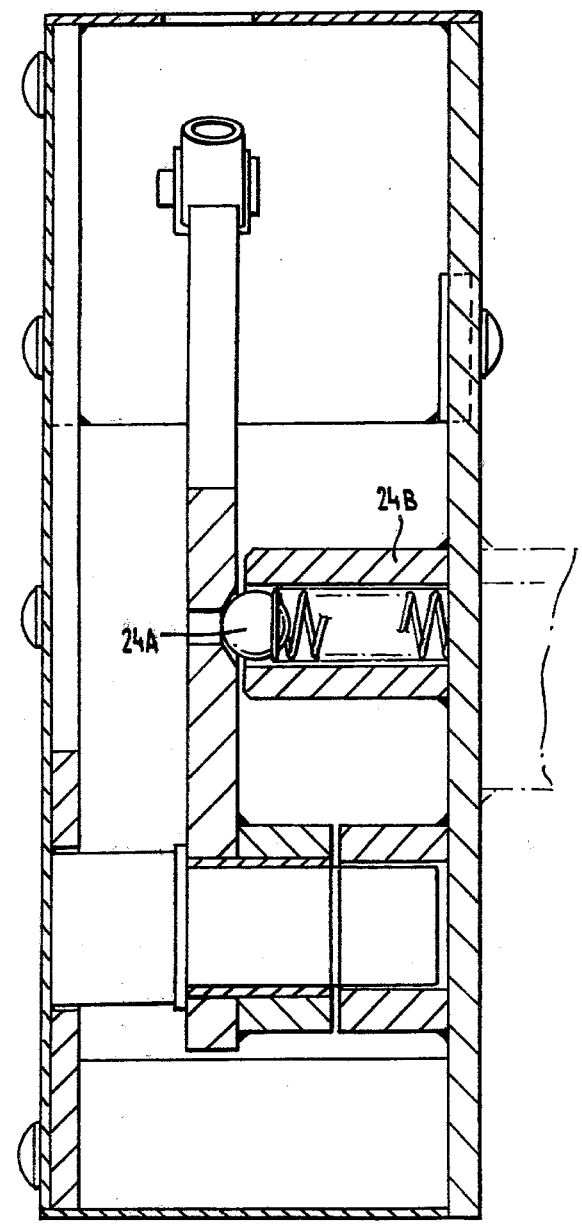
Figure 5:
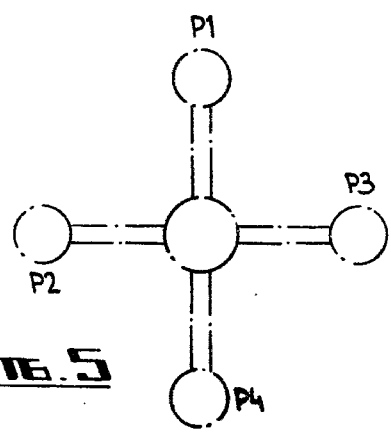
Figure 6:
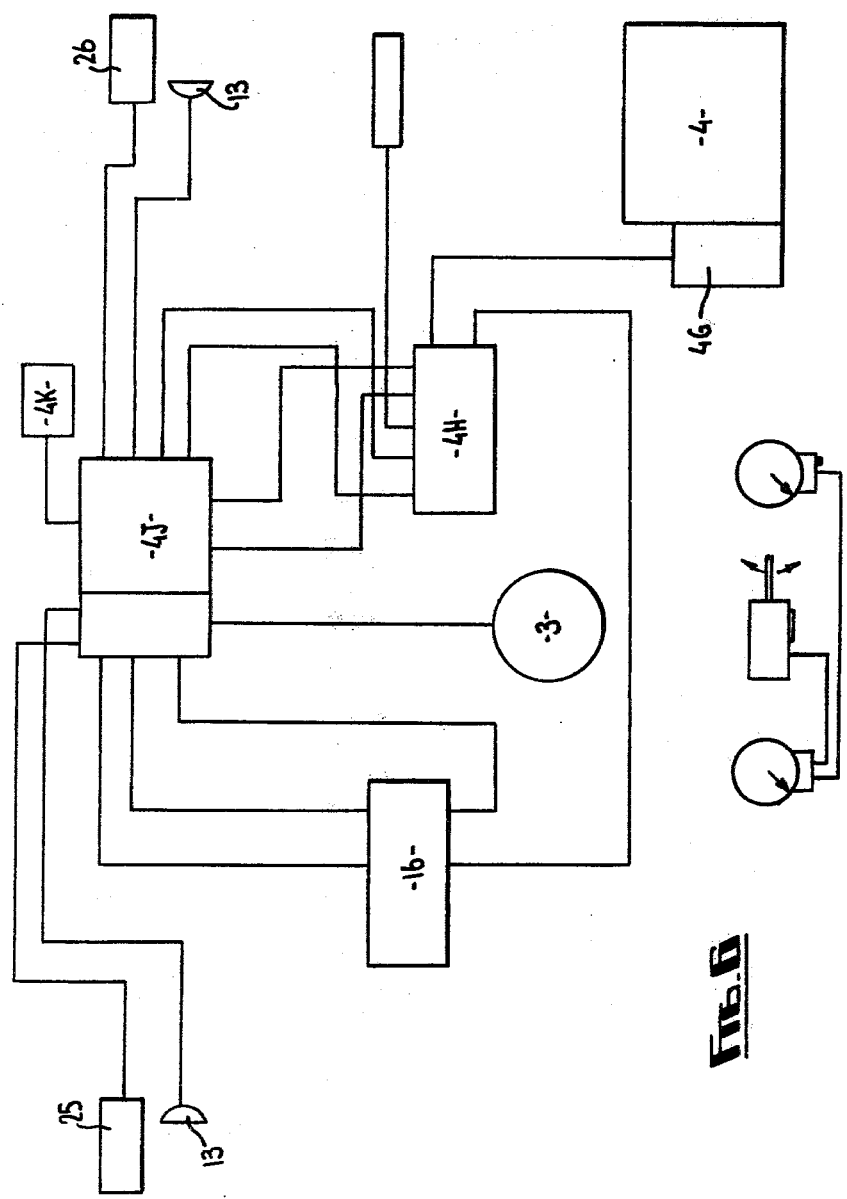

FIG. 4 shows a front view of a rotary switch forming a part of the carrier of FIG. 1, FIG. 4A is a section through a socket for the drive/brake lever of the carrier of FIG. 1, FIG. 5 is a sketch indicating various operational positions of the switch of FIG. 4, FIG. 6 is a block circuit diagram of the electrical equipment of the underground personnel carrier of FIG. 1, and FIG. 7 is a hydraulic circuit diagram of the hydraulically operable equipment of the underground personnel carrier of FIG. 1.

Referring to FIGS. 1 to 3 of the drawings the underground personnel carrier comprises a vehicle frame 1 mounted on a bogie having four rail wheels arranged in two pairs 2 on respective revolving axles. The carrier is driven by a flameproof D.C. series wound traction motor 3 disposed between the axles and which receives power from an electrical storage battery located in a box to form a unit 4 also disposed between the two axles. The vehicle frame/chassis 1 is a robust fabricated structure built up from rolled hollow section and folded plate and includes integral sandboxes 21 and sub-frame 4A for battery and box 4. Attachment points are provided for wheels and axles/suspension units, traction motor, gearbox torque reaction, etc. Four, "strongpoints" 1A for jacking of the vehicle are provided adjacent to the suspension units and towing of the vehicle is permitted by lugs 1B built into the outer lower corners of each cab.

The battery is a 36 cell lead acid battery having a capacity of 380 ampere hours at the 5 hour rate of discharge. This electrial storage battery has ribbed cells giving improved ventilation and flexible polychloroprene insulated copper intercell connectors are used with terminals solidly bonded to double battery posts and insulated. The fabricated steel box is lined with neoprene and is robustly constructed and incorporates features for the adequate ventilation of the cells, the motion of the vehicle being used to encourage dispersion of any gases. The space above the top cover is provided with drainage slots 4B to permit the unit to be hosed down if required, this drainage being ducted clear of principle electrical components in the frame. Hinged lids 4C on top of the box provide ready access for the battery servicing.

The battery and box unit 4 is attached to the sub-frame 4A by means of quick release catches 4E whose operating handles are arranged to give a visual warning when in the released position. "Vee" grooved ball bearing wheels 4F at each corner of the box locate on square section transverse rails forming part of the sub-frame 4A and are used to transfer the unit by means of an appropriate bridge structure to a lineside staging (or platform) for electrical charging. (A third wheel each side of the box may be added if required). With the bridge removed a safety gap is provided to stop and hold the box should it move in the event of the catches not being operated. Provision is also made for the battery box to be lifted off by crane etc., should this be required.

The battery box sub-frame 4A forms an integral part of the vehicle frame 1 and is arranged to transfer the weight of the battery and box 4 direct to the axle suspension arrangement, thus reducing the stresses in the vehicle frame.

A flameproof switch unit 4G incorporating 200 amp main fuses and battery discharge meter is fitted to one end of the battery box 4D and is provided with a plug and socket connection to a control unit 4H. A safety interlock prevents removal of the plug unless the isolating switch is in the "off" position.

The drive from the motor 3 is to one only of the axles 2 and is transmitted through a cardan shaft and axle-mounted gear box 5 which is linked to the vehicle frame by a suitable rubber-bushed torque link. Alternatively, and especially when the vehicle is to be used on steep gradients a double-ended electric motor may be fitted and both axles driven. This would give greatly improved traction and electrical braking which in turn would improve performance and safety when working on gradients approaching the maximum of 1:15. Driving both axles requires a gearbox on each and advantage could be taken of the ratio in the gearboxes to mount a lighter, more efficient fail-safe hydraulic disc brake to operate on the gearbox input shafts instead of directly on the axle. The gearbox contains a single reduction worm drive running on ball and roller bearings. The steel worm meshes with a phosphor bronze wheel, the wheel rim being bolted to a flanged centre pressed and keyed onto the axle and all enclosed in a cast iron base. Lubrication of the gears is by splash from an oil reserve while remote bearings are grease lubricated. Double seals and special fine gauge breather filters are provided to exclude coal dust etc. The worm shaft carries a flange for the propellor shaft. Each axle is of carbon steel. The associated pair of rail wheels are of cast steel of 530 mm diameter and are pressed on the axle. The ends of the axles carry axleboxes containing taper roller bearings. Both of the axles are located in and support the body of the vehicle through bonded neoprene chevron mountings 7 and 8.

A driving cab 9, 10 is located at each end of the vehicle welded to the vehicle frame 1. Both cabs are provided with identical sets of driving controls 11, 12 and seating for three people. A suitable linkage allows the isolating switch 4G to be operated from either cab 9, 10 via an aperture in the cab back. Each cab is fabricated from hollow section and 3 mm thick plate and has a full width window 9A, 10A of 6 mm thick toughened glass glazed with a suitable section extruded rubber surround 9B, 10B. Seats and back-rests of fire resistant timber are provided and sideplates permit ease of entry and exit. Entry to each cab is from either side of the vehicle. Each cab has a combined head and tail lamp 13 on its external end face and an aperture protected by fixed bars in the roof normally closed off by a four-fold lockable door 14, 15 which, when opened, allows the roof of the tunnel to be inspected through the bars from inside the vehicle. Only the controls of one cab are activated at any one time in dependence upon the position of a flameproof rotary switch 16 (see FIG. 4) disposed substantially midway between the two cabs on the side of the vehicle and easily accessible from outside the vehicle. The position of this switch (see FIG. 5) also controls the operative condition of the combined head and tail lamps. Referring to FIG. 5, the switch has four positions P1 to P4. P1 is the off position. All electrical circuits are open circuited with the switch at position P1. Position P2 and P3 are respective direction of travel positions. In these positions the controls in the appropriate cab 9, 10 are activated and head/tail lamps 13 are switched to their operational conditions appropriate to the direction of travel. Position P4 is a parking position used when the vehicle is required to be stationary on the track. In this position all circuits are isolated except those supplying the lamps 13 which are switched to show red at both vehicle ends. A speedometer 18, 19, a hand operable brass bell (not shown) for warning of approach, a lever 20 (FIG. 3) enabling sand to be fed under gravity to the rails to either side of the wheels from a sandbox 21 and a socket for the reception of a single drive/brake lever 24 is disposed in each cab. Referring to FIG. 4A, the lever 24, conveniently placed under the driver's right hand, is spring biassed from "power" to neutral which position may be felt by the location of a spring loaded ball 24A in a detent 24B. The power lever is connected to the lever on the Motor Control Unit by means of a flexible control cable suitably supported. The sanding operating lever 20 is positioned under the driver's left hand and is connected to the sand valves disposed in the sandboxes by flexible cables and rods.

The single drive/brake lever feature is an added safety point to the function of the rotary switch 16. Although a spare lever would normally be provided for emergency use, this would not necessarily be on the vehicle itself. There is also disposed in each cab a deadmans or safety foot pedal 25, 26 which can only conveniently be operated by the driver from a seated position. Each foot pedal 25, 26 operates a quick make/brake switch which energises the power and electric brake circuits from the end selected by the rotary switch 16, thus ensuring that the driver is in position before moving the vehicle.

The same foot pedal also controls the hydraulically operable emergency/parking brake which will be described later.

Each speedometer 18, 19 is intrinsically safe and is graduated in miles per hour and meters per second or other suitable units and responds to the output of a single alternator driven from the traction motor shaft by a F.R.A.S. tooth belt drive. A separate mechanical odometer graduated in miles is similarly driven by the same belt and may be viewed from the side of the vehicle.

Referring particularly to FIG. 6, the control unit 4H consists of Thyristor Motor controls mounted within a flameproof housing and operated by an external lever connected to the driver's controls 12. Movement of this lever smoothly applies power in proportion to the degree of movement; the power delivered to the traction motor 3 being continually monitored and automatically controlled so that a maximum predetermined level will never be exceeded. This prevents overload of motor, excessive current demand which would shorten battery life and allows provision of thermal protection for the controller 4H to reduce power if temperature rise is excessive.

Two stages of electrical braking are achieved by selecting "braking" while moving forward, the control unit 4H providing dynamic braking down to a low speed by allowing the motor to act as an electrical generator supplying energy to a large electrial resistor, and "plug" braking from this low speed down to zero speed by applying a reverse driving current to the motor. The rate of deceleration is under the control of the driver and maximum braking is automatically controlled by the thyristor equipment so that excessive stresses cannot be applied.

The "direction" signal from the rotary switch 16 determines direction of travel and also inhibits reverse running when "braking" is selected.

The motor control unit also provides electrical connections to the changeover and deadmeans switches through a junction box 4J and a 24 volt supply for headlights. An earth fault relay in the unit provides a visual warning which may be seen from the side of the vehicle.

A flameproof resistance box 30 is mounted above the traction motor 3 and connected into the braking circuit via a contractor in the control unit in order to dissipate heat generated during braking. A temperature gauge is provided in each cab 9, 10 to monitor the surface temperature of the resistance box.

As already indicated, in relation to the control unit, normal service braking is electrical and achieved by moving the control lever 24 from "power" to "braking" the amount of movement governing the degree of braking, and provided the "deadman's" pedal 25, 26 remains depressed. However, for parking and emergency use the vehicle is provided with a "fail safe" disc brake unit on each axle. Each unit consists of a spark proof caliper brake 37 in which the brake pads are applied by disc springs (helical coil springs could alternatively be used) and held off by hydraulic pressure (see FIG. 7 for hydraulic circuit). The pads act upon a 300 mm (12") disc bolted to a hub on each axle and arranged to give a brake retarding force equal to between 16% and 21% of vehicle weight. Alternatively and where a gearbox is provided on each axle a brake disc may be bolted to a flange on the input shaft of each gearbox and failsafe brake units arranged so that the pads act on the discs in a similar manner. Each driving position is provided with a hand operated pump 31 to create pressure to release the disc brakes—the pressure being stored in a suitable hydraulic accumulator 42. A pressure reducing valve 43 limits the maximum release pressure to 51.7 bar (750 psi) to prevent damage to the brake system.

The driver's foot pedal also operates a spring-loaded valve 41 in the brake hydraulic circuit and depressing the pedals 25, 26 permits the brakes to be released. When the foot pedal is released the valve opens under spring pressure thus applying the disc brakes. A suitable reservoir 39 with filter maintains fluid in the circuit and a pressure gauge 36 with coloured segments in each cab indicates the hydraulic pressure at the brake units. The hydraulic fluid may be a 60:40 water in oil emulsion or other suitable fluid. A flameproof pressure switch 4K is incorporated in the hydraulic circuit to prevent power being applied to the traction motor until sufficient hydraulic pressure has been generated to enable the disc brakes to be released.

As described the disc brakes cannot usually be applied in addition to the electric braking but the parking brake is automatically applied whenever the driver releases the deadmans pedal, whether to leave the cab or for any other reason.

In addition each driving position is provided with a hand operated, normally closed, emergency valve 32, connected directly to the brake units. Operation of this valve over-rides the normal controls and releases hydraulic fluid to the reservoir, thus permitting rapid application of the brake.

Because disc brakes are used instead of brake blocks working in the outside diameter of the wheel, optionally, where wet pit conditions warrant it, a light spring loaded scraper block may be provided to clean the wheel treads.

The vehicle would be equipped for emergency use. Recovery apparatus such as streatchers would preferably be carried. Apparatus for routine inspection and safety checks would also be carried.

It will be appreciated that the above embodiment has been described by way of example only and that many variations are possible without departing from the scope of the invention. It will also be appreciated that although the vehicle described is one for use in an underground mining operation, it could be used in other situations.

What is claimed is:

1. A vehicle for carriage of personnel comprising:
a vehicle body including a driving cab at each end thereof;
traction means operatively carried by said vehicle body for driving the vehicle;
driving control means in each driving cab, said driving control means in each cab being respectively linked to said traction means, each driving control means being operative to permit movement of the vehicle only in the direction the cab faces, and both driving control means including braking means for the vehicle;
and selector means operatively connected to each of said driving control means, said selector means having at least two positions, a first position for activating said driving control means in one of said cabs and a second position for activating said driving control means in the other of said cabs.

2. A vehicle as claimed in claim 1, including a single lever operatively connected to said driving control means in each cab for controlling both drive and braking of the respective driving control means.

3. A vehicle as claimed in claim 2, in which said single lever is detachable from either of said driving control means and is provided for both sets of controls.

4. A vehicle as claimed in claim 1 in which said selector means is a rotary switch operative to activate only the driving control means in one of the respective cabs at a time.

5. A vehicle as claimed in claim 4, in which said rotary switch is disposed between the cabs on the vehicle body.

6. A vehicle as claimed in claim 1, in which an emergency braking system is included comprising a disc brake disposed to act on a wheel of the vehicle and having pads biassed to the on position by springs and a hydraulically operated piston and cylinder device operative to oppose the action of the springs to hold the brake off, and means for releasing the hydraulic pressure to allow the springs to urge the disc pads to an on position.

7. A vehicle as claimed in claim 6, in which the piston and cylinder device has a hydraulic circuit including a pressure switch operative to isolate the traction means until sufficient hydraulic pressure is available to release the emergency brake.

8. A vehicle as claimed in claim 1 in which each of said cabs includes a foot pedal coupled to the respective driving control means of the cab, said foot pedal's operation being necessary to activate the drive/braking control of said driving control means.

* * * * *